US012699452B2

(12) United States Patent
Wieland et al.

(10) Patent No.: US 12,699,452 B2
(45) Date of Patent: Aug. 4, 2026

(54) METHOD AND DEVICE FOR CARRYING OUT EYE TRACKING

(71) Applicant: Robert Bosch GmbH, Stuttgart (DE)

(72) Inventors: Christoph Wieland, Wiesloch (DE); Daniela Zoeller-Borst, Tuebingen (DE); Victor Pankratius, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/835,729

(22) PCT Filed: Jan. 19, 2023

(86) PCT No.: PCT/EP2023/051159
§ 371 (c)(1),
(2) Date: Aug. 4, 2024

(87) PCT Pub. No.: WO2023/151912
PCT Pub. Date: Aug. 17, 2023

(65) Prior Publication Data
US 2025/0147590 A1 May 8, 2025

(30) Foreign Application Priority Data
Feb. 9, 2022 (DE) ..................... 10 2022 201 319.0

(51) Int. Cl.
*G06F 3/01* (2006.01)
(52) U.S. Cl.
CPC ................................... *G06F 3/015* (2013.01)
(58) Field of Classification Search
CPC .............................................. G06F 3/012–015
See application file for complete search history.

(56) References Cited

U.S. PATENT DOCUMENTS

2003/0181821 A1* 9/2003 Greenwald ............ A61B 5/374
600/544
2012/0083668 A1* 4/2012 Pradeep ............... A61B 5/6803
600/300
(Continued)

FOREIGN PATENT DOCUMENTS

CN 107822627 A 3/2018
WO 2021150971 A1 7/2021

OTHER PUBLICATIONS

International Search Report corresponding to PCT Application No. PCT/EP2023/051159, mailed Apr. 3, 2023. (German and English language document). (5 pages).
(Continued)

*Primary Examiner* — Hang Lin
(74) *Attorney, Agent, or Firm* — Maginot, Moore & Beck LLP

(57) ABSTRACT

A method is disclosed for determining an eye position and/or eye gesture, in particular for use in controlling a function of an application system, in particular a wearable. The method includes (i) recording a profile of at least one EEG signal over time by way of a contact electrode in order to obtain a signal time series of the at least one EEG signal, (ii) providing input data sets from a signal block which arises from the signal time series, for successive time windows, and (iii) evaluating the input data sets in a data-based eye movement model in order to obtain the eye position or eye gesture, the eye movement model being formed using a neural network with one or more recurrent layers, in particular a respective LSTM layer or GRU layer or a transformer layer, and one or more neuron layers.

11 Claims, 2 Drawing Sheets

(56) References Cited

U.S. PATENT DOCUMENTS

| | | | |
|---|---|---|---|
| 2015/0126845 A1 | 5/2015 | Jin et al. | |
| 2017/0287447 A1* | 10/2017 | Barry | G09G 5/391 |
| 2017/0371412 A1* | 12/2017 | Liu | G06F 3/012 |
| 2018/0116578 A1 | 5/2018 | Tzvieli et al. | |
| 2019/0243691 A1* | 8/2019 | LaBute | H04L 47/83 |
| 2021/0235203 A1 | 7/2021 | Lunner et al. | |
| 2021/0374455 A1* | 12/2021 | Ghosh | G06V 30/413 |
| 2022/0334637 A1* | 10/2022 | Sharma | G06N 3/08 |

OTHER PUBLICATIONS

Gite, Shilpa et al., "ADMT: Advanced Driver's Movement Tracking System Using Spatio-Temporal Interest Points and Maneuver Anticipation Using Deep Neural Networks," IEEE, Jul. 9, 2021, pp. 99312-99326, vol. 9, XP011867237 (15 pages).

* cited by examiner

METHOD AND DEVICE FOR CARRYING OUT EYE TRACKING

This application is a 35 U.S.C. § 371 National Stage Application of PCT/EP2023/051159, filed on Jan. 19, 2023 which claims the benefit of priority to Serial No. DE 10 2022 201 319.0, filed on Feb. 9, 2022 in Germany, the disclosures of which are incorporated herein by reference in their entirety.

The disclosure relates to methods for recognizing an eye position, in particular an orientation of the eyeball, and detecting eye gestures based on EEG signals. The present disclosure in particular relates to an improved evaluation of EEG signals for eye tracking.

BACKGROUND

A wide variety of applications that are based on an eye position or detecting a gaze direction of a user are known. For smart glasses, for example, the gaze direction can be determinative for the way an augmented reality display is presented. Eye gestures, i.e., defined movements of the eyeball, can also be used to control functions, in particular in vehicles.

Existing methods for determining eye movement are camera-based or laser-based and require complex calculation steps to determine the eye position. This leads to high demands on the hardware to determine the eye position or the eye gesture.

The use of EEG signals that indicate a state of eye muscles or their movements to detect eye movement is known from the prior art as well.

The document US 2015 0 126 845 A1 discloses a device for acquiring electrooculographic (EOG) signals, comprising a pair of temple pieces connected to a bridging structure, at least one electrode on each temple piece configured to contact the skin on the temple and receive an EOG signal from a proximate orbital socket, a reference electrode disposed away from each temple, and a processor configured to process signals from the at least one electrode on each temple piece and the reference electrode to acquire saccade movements of the eyes.

The document US 2021 0 235 203 A1 discloses a method for recording body signals from the head of a user, wherein the method comprises: attaching a first and a second electrode to a first and a second different position on a first side of the head of the user in direct or capacitive contact with the head of the user, and providing an electrooculography signal representing a corneo-retinal potential difference of the first eye of the user as a function of first and second electrical potentials on an ear of the user. The electrooculography signal can be used to monitor the eye movements of the user.

The document US 2018 0 116 578 A1 discloses a system that is configured to identify atypical behavior comprising: an eye tracker configured to track a user's gaze while viewing objects; an inward-facing head-mounted thermal camera (CAM) configured to take thermal measurements of a region of interest on the face (THROI) of the user; a computer configured to generate characteristics values based on THROI and the tracking; and using a model to identify atypical behavior of the user based on the characteristics values; wherein the model was trained based on previous tracking and previous THROI of the user taken while viewing other objects. The characteristics values can be generated using an EEG sensor.

The document CN 107 822 627 A discloses a method for detecting eye movement signals based on EEG signals, wherein an electrical signal from the brain is processed using an SK algorithm to detect eye movement.

The object of the present disclosure is to provide an improved method for carrying out eye tracking on the basis of a small number of EEG signals, which enables improved eye tracking and can in particular detect the current eye position.

This object is achieved by the method for carrying out eye tracking according to claim 1 and by the corresponding device and application system according to the ancillary claims.

Further embodiments are specified in the dependent claims.

According to a first aspect, a method for eye tracking, in particular for determining an eye position and/or an eye gesture, in particular for use in controlling a function of a wearable, is provided, which comprises the following steps:

acquiring a profile of at least one EEG signal over time by means of a contact electrode in order to obtain a signal time series of the at least one EEG signal;

providing input data sets from a signal block which arises from the signal time series for successive time windows;

evaluating the input data sets in a data-based eye movement model in order to obtain the eye position or the eye gesture, wherein the eye movement model is configured with a neural network comprising one or more recurrent layers, in particular a respective LSTM layer or GRU layer or a transformer layer, and one or more neuron layers.

The prior art solutions require complex electrode arrangements which generally comprise a large number of electrodes in order to obtain sufficient EEG signals (electroencephalography signals) from which eye movement can be inferred. The EEG signals are fraught with a significant amount of interference. Therefore, the smaller the number of electrodes, the more complex and inaccurate the evaluation of the signals usually is. This makes the determination of the eye position too inaccurate or too unreliable to reliably determine an eye position, i.e., an orientation of the eyeball, in the head of the user.

EEG signals (electroencephalography signals) are electrical signals which are composed of electrical nerve impulses both from the brain and to muscles. EEG signals are voltages that result from ionic currents in neurons of the brain and along nerve pathways when there is activity. EEG signals are usually picked up on the surface of the skin and therefore represent a superposition of a large number of signals from neurons and nerve pathways. The human body is moreover subject to a wide range of external influences from electromagnetic interference, which are likewise reflected in the EEG signals.

In conventional everyday applications, however, only a small number of electrodes can be tolerated on the user's head. These should be disposed in such a way that the contact surfaces and the contact with the skin can easily be implemented using conventional devices, such as smart glasses or in-ear or over-ear headphones. These devices are referred to here as wearables.

Therefore, for conventional applications that implement eye tracking based on EEG signals, only a few contact points are available, for example in the region of side pieces or the nose pad in smart glasses or in the ear region in in-ear or over-ear headphones.

The detection of eye movements and the continuous determination of eye positions is relevant in practice, however, because these can be a form of input for smart devices, such as hearables, i.e., smart headphones, to trigger functions depending on eye gestures, eye movements, or the user's attention level. In the context of hearables, blinking can be interpreted as an input instruction or an eye roll as an instruction to reject an incoming call.

In the context of smart glasses, the eye position can be used to determine the user's focus point, so that the user's field of view, or the objects in the surroundings the user is currently looking at, can be identified. This information can be used to display specific information about these objects in the surroundings or to determine the user's concentration or attention level. The field of view also enables contact analog information to be displayed at a position in a display surface of the smart glasses that is related to the respective object in the surroundings, so that the user perceives said information in relation to the object in the surroundings.

The evaluation of EEG signals to detect an eye position as known from the prior art is furthermore very complex and requires the arrangement of a plurality of electrodes on the head of the user.

However, the above solution provides a method for detecting for carrying out eye tracking based on EEG signals, which requires only a very small number of a few contact electrodes on the head of the user and nonetheless makes it possible to obtain reliable information about an eye position or an eye gesture. Therefore, since it is easy to provide a few electrodes in conventional application systems, such as smart glasses or hearables, without having an additional disturbing effect on the user, the above method opens up the use of eye tracking for user-friendly applications.

In contrast to other conventional methods for determining eye position, such as camera-based or laser-based methods, which are strongly affected by changing lighting conditions, eye tracking based on the evaluation of EEG signals also works when the user blinks or when the eyelids are closed.

The above method provides a novel approach to evaluating a small number of EEG signals relating to eye movements using a data-based eye movement model. Whereas the conventional EEG signal-based applications have focused on obtaining the electrical signals with the best possible physical accuracy, the proposed approach is more tolerant of noisy signals. The above method in particular does not neglect the portion of the EEG signals that is considered in conventional applications to be noise and results primarily from the electrical activity of muscle contractions, but rather specifically evaluates the signal components in the EEG signals that result from muscle contractions, namely the signal components that can be attributed to the eye muscles, and ignores the signals from the neuron activity as noise.

It can be provided that the signal time series is processed to remove interference, wherein the interference in particular includes a jitter, a potential trend, and/or a noise component and is removed or reduced in particular by means of conventional digital signal processing techniques, such as linear regression, trend elimination, or noise elimination, wherein the input data sets are provided from the signal block which results with or from the processed signal time series.

The at least one EEG signal is first preprocessed to remove jitter, a potential trend, and/or a noise component, in particular using conventional digital signal processing techniques, such as linear regression, for example based on a least square fit, a trend elimination, or a noise elimination, for example a moving average method, a frequency analysis method, and/or a wavelet transformation for noise reduction.

The at least one processed EEG signal is now packed into an input data set and evaluated using the data-based eye movement model. The data-based eye movement model comprises at least one recurrent neuron layer of a neural network, such as LSTM or GRU or transformer, and at least one output layer as a neuron layer of conventional neurons (fully connected layer).

One or more signal characteristics can be extracted from the (processed) signal time series, wherein the one or more signal characteristics are added to the relevant input data set for the respective time window.

The at least one EEG signal can be evaluated directly and/or using extracted characteristics of the at least one EEG signal, such as the signal energy or a frequency spectrum. The frequency spectra can in particular be provided as a whole or divided into subdivided EEG frequency bands delta, theta, alpha, beta, and gamma and as separate characteristics.

The eye position can be provided in a two-dimensional eye coordinate system, wherein an x-value indicates a horizontal eye position and a y-value indicates a vertical eye position. On the output side, the eye movement model thus provides eye positions in a two-dimensional eye coordinate system, wherein the x-axis can indicate eye movements to the left and right and the y-axis can indicate up and down eye movements. Since eye movement occurs in saccades, the eye movement model can optionally also determine the movement directions as focal regions in the coordinate system.

The evaluation of the processed EEG signals is carried out on input data sets which, for each of the processed EEG signals, provide a signal time series that depicts a signal progression within an evaluation time window covering a predetermined length of time. The signal time series are determined for successive evaluation time windows and evaluated one after the other by the eye movement model. The input data sets can also comprise characteristics extracted from one or more of the respective signal time series. The current eye position is output on the output side of the output layer, in particular in x-y coordinates.

According to a further aspect, a device for carrying out the above method is provided.

According to a further aspect, an application system, in particular a head-mounted device, comprising one or more attached contact electrodes for acquiring a respective EEG signal and the above device is provided.

The application system can in particular be configured as smart glasses, wherein one or more contact electrodes are disposed on a side piece and/or on a nose pad.

In an application system, for example a wearable device (wearable), for example a hearable (headphones) or smart glasses, electrodes can easily be placed on the surfaces of the wearable device that rest against the head of the user. The evaluation can take place in the wearable device and, for example in smart glasses, can be used to improve a field-of-view dependent display of augmented information.

According to a further aspect, a method for training a data-based eye movement model is provided, wherein the eye movement model is a neural network comprising one or more recurrent layers, in particular a respective LSTM layer or GRU layer or a transformer layer, and one or more neuron layers; comprising the following steps:

creating training data sets, wherein the training data sets are respectively created by acquiring a profile of at least one EEG signal over time by means of at least one contact electrode in order to obtain a signal time series of the at least one EEG signal; determining a signal block depending on the signal time series for one of successive time windows, determining an eye position and/or eye gesture during the respective time window, providing an input data set from the respective signal block and the associated eye position and/or eye gesture as a training data set;

training the eye movement model with the training data sets.

According to a further aspect, a device for carrying out the above method is provided.

BRIEF DESCRIPTION OF THE DRAWINGS

Embodiments are explained in more detail in the following with reference to the accompanying drawings. The figures show.

DETAILED DESCRIPTION

Figure 1:
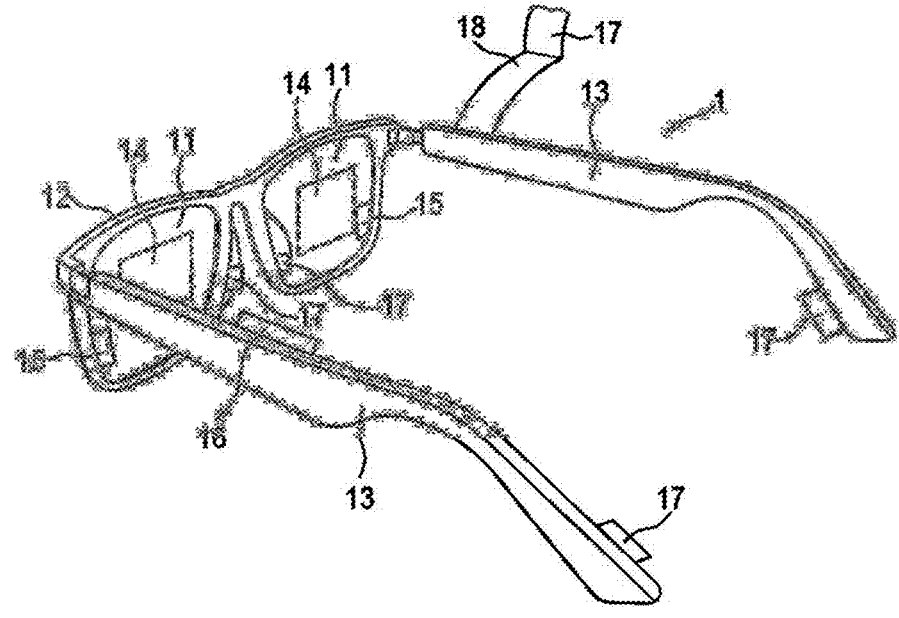
FIG. 1 a schematic illustration of a pair of smart glasses for displaying augmented field-of-view dependent information.

FIG. 1 shows a pair of smart glasses 1 as an example of an application system. The smart glasses 1 comprise two transparent view panels 11, which are enclosed in a frame 12 in a manner known per se. The frame 12 is provided with side pieces 13, so that the smart glasses 1 can be worn on the head of a user in a manner known per se.

One or both view panels 11 (lenses) are further provided with a transparent display surface 14, via which a display image for displaying virtual information objects can be projected into the eye of the wearer of the smart glasses 3 by a display unit 15, which can, for instance, comprise a projection device or the like and is disposed on the frame 12. The display unit 15 is controlled by a control device 16, which can comprise a microprocessor or a comparable computing unit, for example. The display unit 15 can be configured to direct an electronically generated display image onto the display surface 14, so that it can be perceived in the eye of the user via reflection.

The transparent design of the display surface 14 allows the electronically generated display image to be superimposed on the real environment that can be perceived through the display surface 14. With the aid of the display unit 15, a virtual information object, such as a text, symbol, video information, graphics or the like, can be displayed on one or both display surfaces 14.

The smart glasses 1 can be worn on the head of the user like a typical vision aid, wherein the frame 12 of the smart glasses 1 rests on the user's nose and the side pieces 13 lie against the user's head and extend over the top of the ear. The gaze direction of the user straight ahead then goes through the transparent display surfaces 14 of the view panels 11, so that the gaze direction of the user, which is defined by an eye position and an optical viewing axis (eye axis), has a fixed relationship to the orientation of the smart glasses 1.

To display information objects, corresponding object information in the form of object data is transmitted from the assistance system 2 to the smart glasses 3. The object data indicate the type of information object, such as a text object, an icon or other identification of a display area, the viewing angle range or viewing angle ranges in which the information object is to be displayed on the display surface 14 and the object position on the display surface on which the information object is to be displayed.

The eye position can be determined with the aid of the control device 16, by evaluating electrical signals, in particular EEG signals, acquired on the head of the user of the smart glasses 1. For this purpose, contact electrodes 17 are provided on the smart glasses 1. The contact electrodes 17 are either provided directly on the frame 12, e.g., on the nose pad or the side pieces 13, for example in the ear region, or are disposed away from the frame 12 or the side pieces 13 with the aid of carrier devices, such as a temple piece 18. The contact electrodes 17 are in signal connection with the control device 16.

To display field-of-view dependent information on the display surface 14, the control device 16 implements a method for evaluating EEG signals in order to obtain an eye position. The eye position is used to determine a field of view in order to display field-of-view dependent information. The thus obtained eye position can therefore then be used to determine the display position and display, size, and perspective of an information object on the display surface, in particular so that the user can perceive the information in proximity to an associated object in the surroundings of the real world.

Figure 2:
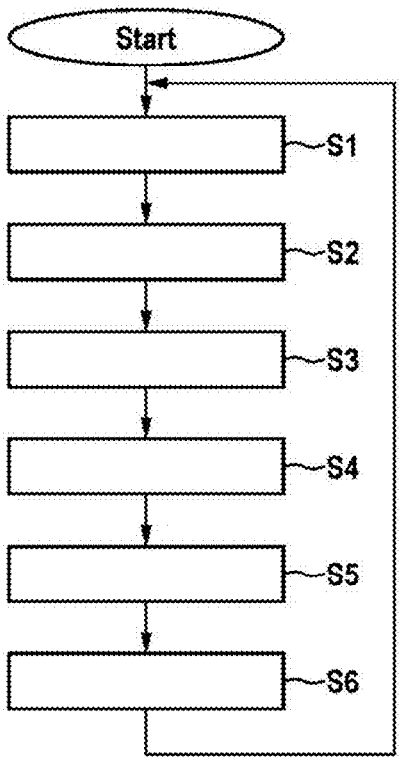
FIG. 2 a flow chart illustrating a method for determining an eye position using a data-based eye movement model.

The method for determining the eye position is explained in more detail using the flow chart of FIG. 2.

Figure 3:
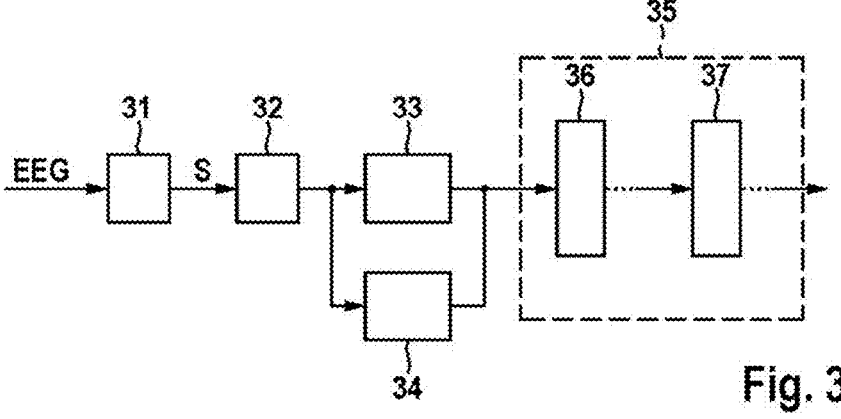
FIG. 3 a block diagram illustrating a possible setup of the eye movement model.

To acquire the eye position, a data-based eye movement model is implemented in the control device. The eye movement model includes an architecture as shown as an example in FIG. 3.

In step S1, the control device acquires the profiles of at least one EEG signal EEG over time, which represents a voltage signal. The voltage signal is picked up on the skin of the user via the contact electrodes 17. The time profile can be acquired digitally with the aid of sampling in an analog-to-digital converter unit 31 and respectively depicted as a signal time series S.

In step S2, the signal time series is processed in a processing block 32, in particular using conventional digital signal processing techniques, to remove a jitter, a signal trend, and/or a noise component, in particular by linear regression, such as a least square fit, trend handling or moving average smoothing for noise reduction, as well as frequency analysis and wavelet transformation methods for noise reduction.

In step S3, the at least one processed signal time series is then combined in a signal block unit 33 to form signal blocks of a time window of predetermined length. With continuous acquisition of the EEG signals, successive processed signal time series of the predetermined length are thus provided.

The processed signal time series can furthermore optionally be analyzed by means of a characteristics extraction in step S4 in a characteristics extraction block 34 to obtain signal characteristics. Other statistical characteristics, such as variances, mean values and the like or domain-specific characteristics, for instance, can be formed here from the signal time series.

The signal time series in the time window and the signal characteristics extracted from it can now be fed to the trained eye movement model 35 as an input data set in step S5. The eye movement model 35 can be configured as an artificial neural network and can comprise one or more recurrent layers 36 of a neural network. The recurrent layers 36 can be configured as LSTM and/or GRU layers. Following the one or more recurrent layers 36, one or more conventional serial neuron layers 37 (fully connected layer) are provided on the output side. The last neuron layer 37 can be configured to output the current eye position. The current eye position can be specified as a position in a two-dimensional surface using a horizontal x-value and a vertical y-value. It can therefore be sufficient for the output vector of the last neuron layer to contain exactly two elements.

A field of view of the eye of the user can then be defined in step S6 depending on the current eye position and, depending on the defined field of view, field-of-view dependent information can be displayed superimposed on a real environment scene on the display surface 14. Evaluating temporal sequences of eye positions in successive evaluation cycles also makes it possible to recognize eye gestures that can be interpreted as input for certain functions of the smart glasses.

The data-based eye movement model 35 can be trained in the conventional manner based on training data. The training data includes input data sets, in the above-described format, which consist of the signal blocks and possibly one or more signal characteristics that are each associated with an eye movement, in particular a short characteristic eye movement (such as for 0.1 to 1 second) or an eye position. The eye movement or an eye position can be determined using separate procedures.

The training can preferably take place in two steps. In a pre-training step, training data from a large number of individuals is used to provide a general basic training state of the data-based eye movement model 35. Training data for a specific user can then be determined in an individualization procedure by acquiring input data sets (in the above format) relating to corresponding eye movements or eye positions and using these for retraining the data-based eye movement model.

This significantly reduces the adaptation time of a pair of smart glasses 1 to a user, because the pre-training has already trained basic patterns of EEG signals for a specific configuration of contact electrodes. It is in principle also possible to detect eye gestures instead of the eye position, because the EEG signals are evaluated as time series signals. Alternatively, both the eye position and eye gestures can be detected, so that a classification vector for different eye gestures can be output in addition to the regression values for the coordinates of the eye position. These eye gestures can include blinking, eye rolling, and up and down eye movement, for instance.

The invention claimed is:

1. A method for determining an eye position and/or eye gesture for use in controlling a function of a wearable, the method comprising:

acquiring a profile of at least one EEG signal over time by way of a contact electrode to obtain a signal time series of the at least one EEG signal;

determining a plurality of input data sets by (i) dividing the signal time series into a plurality of successive time windows, (ii) extracting respective signal characteristics from each of the plurality of successive time windows, and (iii) forming each respective input data set in the plurality of data sets to include a respective time window from the plurality of successive time windows and the respective signal characteristics extracted from the respective time window; and determining a respective eye position and/or a respective eye gesture for each respective time window in the plurality of successive time windows by evaluating each respective input data set in the plurality of data sets using a data-based eye movement model, the data-based eye movement model being a neural network having one or more recurrent layers and one or more neuron layers and being configured to output the eye position and/or the eye gesture.

2. The method according to claim 1, wherein:

the signal time series is processed to remove interference, the interference includes a jitter, a potential trend, and/or a noise component and is removed or reduced, and the input data sets are determined from provided from the processed signal time series.

3. The method according to claim 1, wherein:

the eye position is provided in a two-dimensional eye coordinate system, and an x-value indicates a horizontal eye position and a y-value indicates a vertical eye position.

4. A device for carrying out the method according to claim 1.

5. An application system, comprising:

one or more attached contact electrodes configured to acquire a respective EEG signal; and the device according to claim 4.

6. The method according to claim 1, wherein the one or more recurrent layers includes a respective LSTM layer or GRU layer or a transformer layer.

7. The method according to claim 2, wherein the interference is removed or reduced by at least one of linear regression, trend elimination, and noise elimination.

8. The application system according to claim 5, wherein the application system includes a head-mounted device.

9. The application system according to claim 8, wherein:

the head-mounted device includes smart glasses, the smart glasses include (i) one or more contact electrodes, and (ii) a side piece and/or a nose pad, and the one or more contact electrodes are disposed on the side piece and/or on the nose pad.

10. A method for training a data-based eye movement model to determine an eye position and/or eye gesture for use in controlling a function of a wearable, wherein the eye movement model is a neural network comprising one or more recurrent layers and one or more neuron layers, comprising:

creating training data sets, wherein the training data sets are respectively created by:

acquiring a profile of at least one EEG signal over time by way of at least one contact electrode to obtain a signal time series of the at least one EEG signal;

determining a plurality of input data sets by (i) dividing the signal time series into, a plurality of successive time windows, (ii) extracting respective signal characteristics from each of the plurality of successive time windows, and iii) forming each respective input data set in the plurality of data sets to include a respective time window from the plurality of successive time windows and the respective signal characteristics extracted from the respective time window, determining, for each respective time window of the plurality of successive time windows, a respective eye position and/or a respective eye gesture during the respective time window; and forming the training data sets from the respective input data set and the respective eye position and/or the respective eye gesture, of each respective time window of the plurality of successive time windows; and training the eye movement model, with the training data sets, to determine an eye position and/or eye gesture.

11. The method according to claim 10, wherein the one or more recurrent layers includes a respective LSTM layer or GRU layer or a transformer layer.

\* \* \* \* \*